Jan. 9, 1951    V. D. LANDON ET AL    2,537,593
FREQUENCY MODULATION ALTIMETER AND RANGE FINDER
Filed Feb. 26, 1947    2 Sheets-Sheet 1

INVENTORS
VERNON D. LANDON &
WENDELL L. CARLSON
BY
ATTORNEY

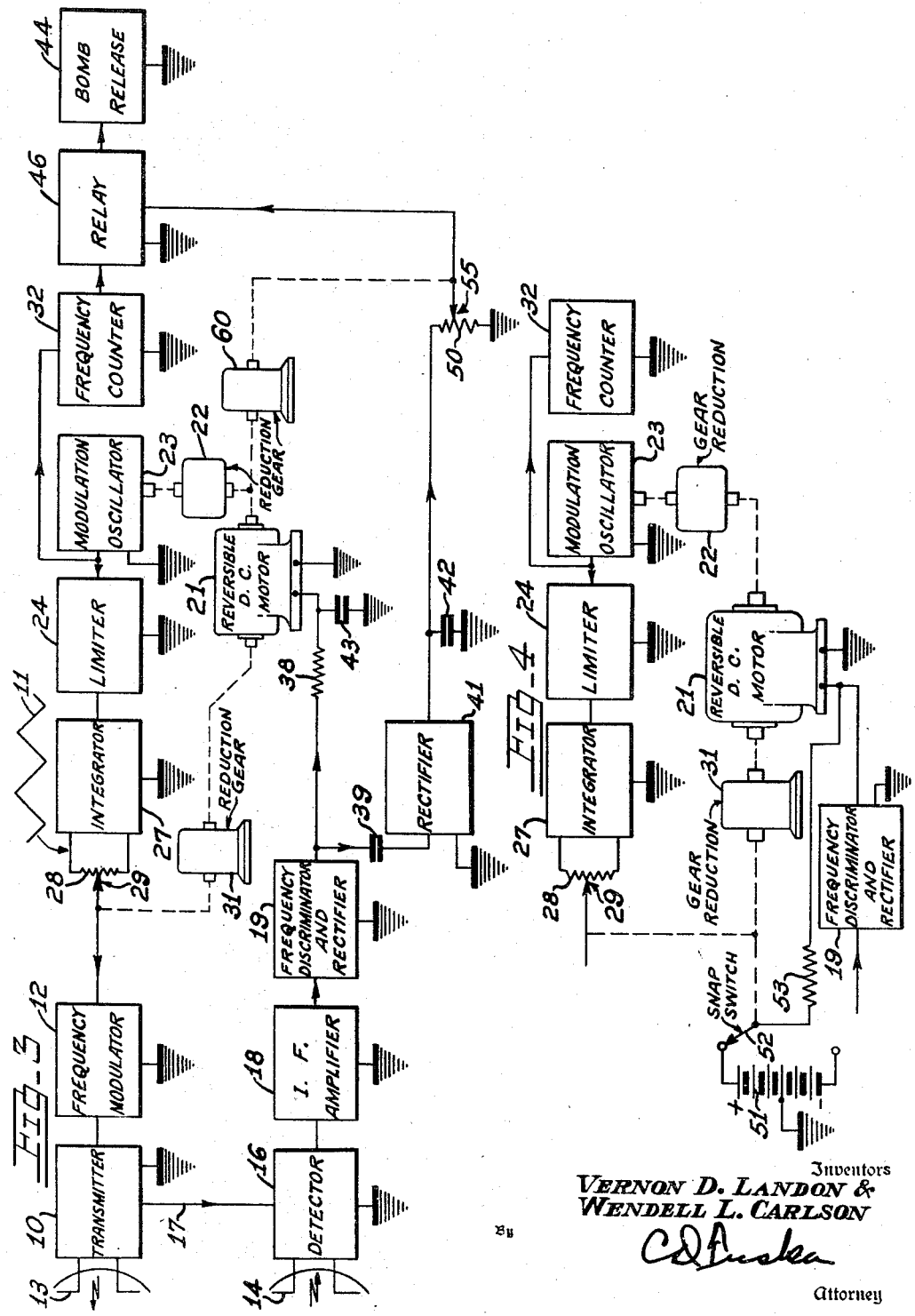

Patented Jan. 9, 1951

2,537,593

UNITED STATES PATENT OFFICE 2,537,593

FREQUENCY MODULATION ALTIMETER AND RANGE FINDER

Vernon D. Landon and Wendell L. Carlson, Princeton, N. J., assignors to Radio Corporation of America, a corporation of Delaware Application February 26, 1947, Serial No. 731,112

7 Claims. (Cl. 343—7)

Our invention relates to frequency modulated radio altimeters and distance or range determining apparatus.

An object of the invention is to provide an improved method of and means for determining distance by utilizing reflected radio waves.

A further object of the invention is to provide an improved radar system of the type wherein a continuously radiated radio wave is frequency modulated.

A further object of the invention is to provide an improved system for determining the speed of a wave reflecting object.

A still further object of the invention is to provide an improved system for bomb release where a reflecting target such as a surface ship is to be bombed.

A still further object of the invention is to provide an improved radar system wherein a target area is automatically searched until the system receives signals reflected from a target.

According to a preferred embodiment of the invention a radio transmitter is cyclically frequency modulated with the rate of frequency change of the transmitted signal so controlled that the beat frequency due to beating of the reflected signal and the transmitter signal is held substantially constant. This control may be effected by passing the beat frequency signal through a frequency discriminator and utilizing the discriminator output to control the said rate of frequency change, preferably, by utilizing said discriminator output to control the frequency of an audio frequency oscillator. Signal from the audio frequency oscillator may be supplied to a frequency counter which is calibrated in terms of distance.

Other objects, features and advantages of the invention will appear from the following description taken in connection with the accompanying drawing in which:

Figure 3 is a block diagram of another embodiment of the invention wherein both distance and speed information are obtained, and Figure 4 is a block diagram showing how a portion of the system shown in Fig. 1 may be modified for automatic scanning of a target area.

In the several figures similar parts are indicated by similar reference characters.

Figure 1:
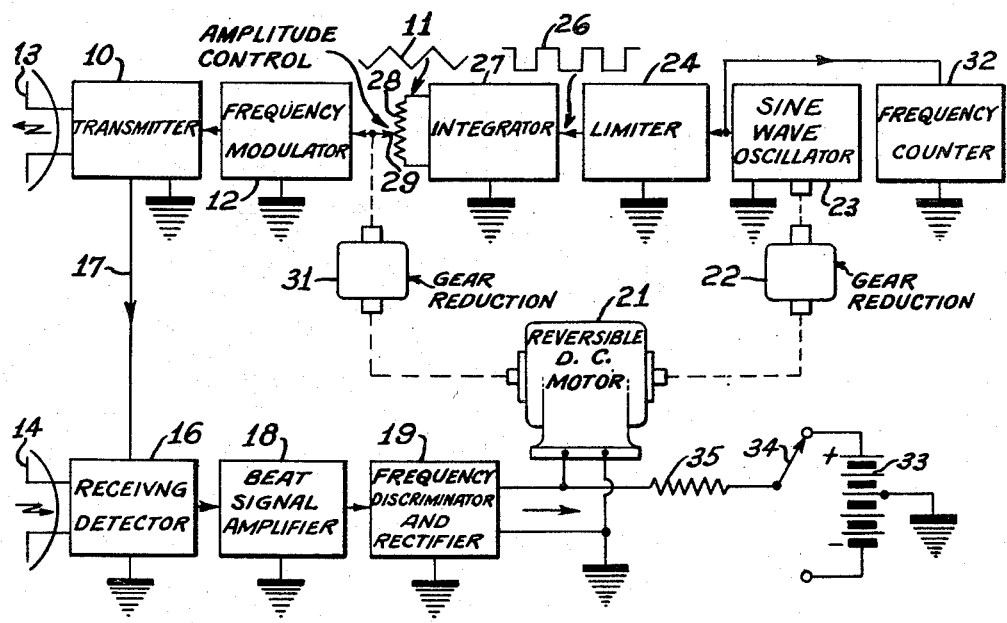
Figure 1 is a block diagram of one embodiment of the invention.

Figure 1 shows a radar system comprising a radio transmitter 10 that is cyclically frequency modulated by a triangular wave signal 11 that is applied to a suitable frequency modulator 12. The frequency modulated waves are radiated from a directive antenna 13 toward the target or other reflecting object and after reflection therefrom are picked up by a receiving antenna 14 and supplied to a detector or mixer 16. Signal direct from the transmitter 10 is supplied over a conductor or cable 17 to the detector where it beats with the received signal to produce a difference frequency that is amplified by a beat frequency amplifier 18.

In the usual FM altimeter the modulating wave 11 is of constant repetition rate and amplitude so that the frequency of the resulting beat frequency signal at the detector 16 is a function of the distance to the reflecting object. According to the present invention, the modulating wave 11 is varied automatically in repetition rate and/or amplitude so as to hold the beat frequency substantially constant.

The automatic control of the beat frequency may be effected by passing the beat frequency signal from the amplifier 18 through a frequency discriminator and rectifier circuit 19 to obtain a direct current that is of either positive or negative polarity depending upon whether the beat frequency is above or below a certain predetermined value. The direct current then drives a reversible D.-C. motor 21 that is mechanically coupled through reduction gearing 22 to a tuning element in a sine wave oscillator 23.

Signal from the oscillator 23 is utilized for producing the triangular modulating wave 11. In the example illustrated, the sine wave signal is passed through a limiter 24 to produce a square wave 26 which is integrated by an integrator 27 to produce the triangular wave 11. The wave 11 is applied to the frequency modulator 12 by way of an amplitude control potentiometer 28 having a variable tap 29 thereon.

The amplitude control means 28, 29 is provided because the amplitude of the triangular wave output of the integrator 27 changes with changes in the frequency of the oscillator 23. The system may be operated with the peak-to-peak amplitude of the wave 11 held constant as its repetition rate is changed. This can be accomplished by properly distributing the resistance winding of the potentiometer 28 and by coupling the tap 29 to the motor 21 through a reduction gear unit 31.

The distance readings may be obtained from a frequency counter 32 that receives signal from the oscillator 23, since the frequency of oscillator 23 is a function of the distance to the target or other reflecting object.

Figure 2:
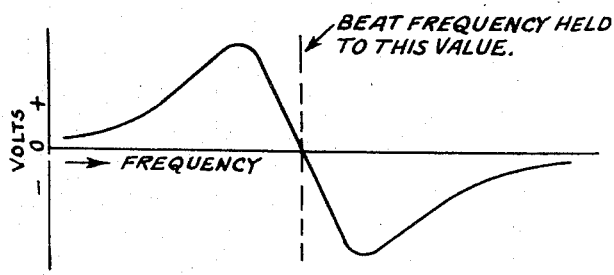
Figure 2 is a graph showing the characteristic of a type of frequency discriminator that may be employed in practicing the invention.

Referring in more detail to the operation of the system of Fig. 1, there is shown in Fig. 2 the frequency response characteristic of the frequency discriminator unit 19 which may be any one of several well known types such as the Seeley discriminator. It will be noted that the D.-C. output is zero if the frequency of the applied signal is the desired predetermined beat frequency, and that a departure from this predetermined frequency results in either a positive or negative D.-C. output.

Assume for example that a reflected signal is being picked up from a stationary target and that the beat frequency is the desired predetermined value. If the distance to the target is now decreased, the beat frequency tends to decrease, a negative direct current is applied to the motor 21 which runs in the direction to increase the frequency of the oscillator 23. As a result, the slope of the wave 11 increases (its amplitude being held constant in the example assumed) and the rate of frequency change of the transmitted radio wave is correspondingly increased. This results in an increase in the beat frequency at the receiver, thus bringing it back to the predetermined value.

In the foregoing description it has been assumed that the beat frequency is held constant solely by varying the modulating frequency M, the width B of the frequency modulation sweep remaining constant since the amplitude of the modulating wave 11 is held constant. If desired, the sweep width B may be varied and the modulating frequency M held constant. In this case the gear reduction unit 22 is disconnected from the oscillator 23 and the distance indication may be obtained from a distance indicator pointer coupled to the gear reduction unit 31.

On the other hand, both the modulating frequency M and the sweep width B may be varied at the same time so that less change in either one is required than where only one is varied. For this purpose the arrangement shown in Fig. 1 may be employed with the distribution of the resistance winding 28 such that the amplitude of the triangular wave 11 increases when the frequency of the oscillator 23 is increased. Also, it should be understood that the frequency control of the oscillator 23 may be accomplished by means of a reactance tube in place of the motor 21 if desired. In that event, a gain control tube is substituted for the volume control 28, 29.

In order to obtain a beat frequency that is within the control range of the discriminator 19, suitable manual control means may be provided for running the motor 21 in one direction or the other. When the beat frequency is brought within the discriminator control range, the discriminator control locks in and the beat frequency is held automatically at the predetermined value. The manual control means may comprise a current source 33 that may be connected to the motor 21 through a manually operable switch 34 and a high resistance resistor 35. The switch 34 may be positioned to drive the motor in either direction.

The operation of the system can be shown mathematically as follows:

Let
$d$ = distance to target
$f_0$ = mean frequency of carrier
$f_1 = f_0 + B/2$
$f_2 = f_0 - B/2$
B = width of frequency sweep
M = modulation frequency Assuming symmetrical sawtooth modulation, the frequency changes from $f_1$ to $f_2$ in $$\frac{1}{2M} \text{ Seconds}$$

and $$\frac{df}{dt} = B \times 2M$$

Let $t$ = time required for a wave to travel a distance equal to $2d$.

$c$ = velocity of light = 300,000,000 meter/sec.
 = $3 \times 10^8 \times 3.28$ ft./sec.
 = $9.8 \times 10^8$ ft./sec.

equals approximately $10^9$ ft./sec.

$$2d = ct$$

$$t = \frac{2d}{c} = \frac{2d}{10^9} \text{ (if } d \text{ is in ft.)}$$

Let $f_B$ = beat frequency
Then $$f_B = \frac{df}{dt} \times t$$

$$= 2MB \times \frac{2d}{10^9}$$

From the foregoing formula it can be seen that $f_B$ can be held constant by making M, or B, or MB, inversely proportional to $d$.

As shown in Fig. 3, if the system is being employed for bomb release, for example, use may be made of the Doppler effect to obtain speed information so that both distance and speed information may be utilized to control the time of release. The distance determining portion of the system of Fig. 3 may be the same as in Fig. 1.

The speed information is obtained by supplying signal from the discriminator and rectifier 19 to a rectifier 41 through an alternating-current connection including a capacitor 39. Due to the Doppler effect the signal applied to the discriminator 19 is one frequency on the up sweep of the modulating wave 11 and a different frequency on the down sweep of the wave 11. Thus there is applied to the rectifier 41 a square wave, and because of the A.-C. coupling, it has no D.-C. component. The resulting D.-C. output of the rectifier 41 has an amplitude that is a function of the peak-to-peak amplitude of the square wave, this proportional to $$\frac{v}{d}$$

where $v$ is the speed. A filter capacitor 42 removes any modulating frequency component that may be present.

In order to obtain an output that is proportional to speed alone, the output of the rectifier 41 is passed through a volume control potentiometer comprising a resistor 50 and a variable tap 55. The tap 55 is coupled through reduction gears 60 to the reversible motor 21 so that as distance to target increases the tap 55 is moved up on resistor 50 to keep the voltage at the tap 55 independent of distance.

The output of the discriminator-rectifier 19 is a function of distance (just as in Fig. 1) since it includes the D.-C. component so that this output is the average D.-C. value of the total signal. A filter capacitor 43 is provided to remove any modulating frequency component that may be present in the output of the discriminator 19. An isolating resistor is shown at 38.

The bomb release device indicated at 44 is actuated by a relay 46 that has both the distance signal and the speed signal applied to it. The relay 46 may be of a type having two windings, one a field winding and the other an armature winding so arranged that the relay will throw when the product of the currents in the field and armature windings reaches a certain value. With this arrangement, assuming the equipment is on an aircraft that is to bomb a target, if the speed of the aircraft is increased the distance from aircraft to target at which the relay closes is increased in direct proportion to the speed.

Figure 4 shows how the system of Fig. 1 may be made to scan the target area until the beat frequency falls within the control region of the discriminator. A source of current indicated at 51 is provided for driving the motor first in one direction and then in the other direction to sweep the frequency of the oscillator 23 through its full frequency range repeatedly. The current from source 51 is applied to the motor 21 through a snap switch 52 and through a high resistance resistor 53. The snap switch 52 is coupled to the reduction gear shaft so that when one end of the frequency range of oscillator 23 is reached, the switch 52 is snapped over to its other position thus reversing the motor 21. When a reflected signal is received and the beat frequency is brought within the operating region of the discriminator 19 (as represented by the graph in Fig. 2) the discriminator output takes over the control of the motor 21 so that the beat frequency is brought to and held at the predetermined value.

We claim as our invention:

1. In a radio system for locating a reflecting object, a receiver including a first detector, transmitter means for producing a radio carrier wave signal, means for producing a modulating wave, means for cyclically frequency modulating said carrier wave signal by said modulating wave, means for supplying signal from said transmitter to said detector substantially undelayed and means for supplying reflected signal to said detector delayed by an amount equal to twice the propagation time from the transmitter to the reflecting object for obtaining a beat frequency signal, frequency discriminator means for converting said beat frequency signal to a control signal having an amplitude that is a function of said beat frequency, and means for controlling the rate of frequency change of said frequency modulated carrier wave signal by said control signal for holding said beat frequency substantially constant, said last means including means for changing the frequency of said modulating wave as a function of said control signal, and a frequency indicator connected to provide a reading that is a function of the frequency of said modulating wave.

2. In a radio system for locating a reflecting object, a receiver including a first detector, transmitter means for producing a radio carrier wave signal, means including an oscillator for producing a modulating wave, means for cyclically frequency modulating said carrier wave signal by said modulating wave, means for supplying signal from said transmitter to said detector substantially undelayed and means for supplying reflected signal to said detector delayed by an amount equal to twice the propagation time from the transmitter to the reflecting object for obtaining a beat frequency signal, frequency discriminator means for converting said beat frequency signal to a control signal having an amplitude that is a function of said beat frequency, and means for controlling the rate of frequency change of said frequency modulated carrier wave signal by said control signal for holding said beat frequency substantially constant, said last means comprising means for controlling the frequency of said oscillator by said control signal, and a frequency indicator to which signal from said oscillator is applied.

3. In a distance determining system utilizing reflected radio waves, a radio transmitter for transmitting a radio wave, means for producing a modulating wave, means for cyclically frequency modulating said transmitter by said modulating wave, means for receiving said wave after reflection, a detector to which both the received wave and a wave direct from the transmitter are applied whereby a difference or beat frequency signal is obtained, a frequency discriminator through which said beat frequency signal is passed, means for rectifying the output of said discriminator to obtain a control signal, and means for controlling the rate of frequency change of the transmitted radio wave as a function of said control signal so as to hold said beat frequency substantially to a predetermined constant value, said last means including means for changing the frequency of said modulating wave as a function of said control signal, and a frequency indicator connected to provide a reading that is a function of the frequency of said modulating wave.

4. In a distance determining system utilizing reflected radio waves, a radio transmitter for transmitting a radio wave, means including a modulating oscillator for cyclically frequency modulating said transmitter, means for receiving said wave after reflection, a detector to which both the received wave and a wave direct from the transmitter are applied whereby a difference or beat frequency signal is obtained, a frequency discriminator through which said beat frequency signal is passed, means for rectifying the output of said discriminator to obtain a control signal, and means for applying said control signal to said oscillator for controlling its frequency and for thereby controlling the rate of frequency change of the transmitted radio wave as a function of said control signal so as to hold said beat frequency substantially to a predetermined constant value, a frequency indicator, and means for applying signal from said oscillator to said indicator 5. In a radio system for locating a reflecting object, a receiver including a first detector, transmitter means for producing a radio carrier wave signal, means for producing a triangular wave, means for cyclically frequency modulating said carrier wave signal by said triangular wave, means for supplying signal from said transmitter to said detector substantially undelayed and means for supplying reflected signal to said detector delayed by an amount equal to twice the propagation time from the transmitter to the reflecting object for obtaining a beat frequency signal, frequency discriminator means for converting said beat frequency signal to an amplitude modulated signal, means for rectifying said last signal to produce a control signal having an amplitude that is a function of said beat frequency, means for controlling the rate of frequency change of said frequency modulated carrier wave signal by said control signal for holding said beat frequency substantially constant, means for supplying a portion of the discriminator output to a second rectifier by way of an alternating-current coupling whereby the input to the second rectifier is a square wave as a result of the Doppler effect and whereby the output of the second rectifier has an amplitude that is a function of the speed of said radio system with respect to the reflecting object.

6. The invention according to claim 2 wherein said oscillator includes a tuning element and wherein said means for controlling the frequency of the oscillator includes a motor that is coupled to said tuning element, said motor being reversible and being connected to receive said control signal as a driving current.

7. The invention according to claim 6 wherein a manual control means is also provided for running the motor in one direction or the other to bring the beat frequency within the range of the frequency discriminator.

VERNON D. LANDON.
WENDELL L. CARLSON.

REFERENCES CITED

The following references are of record in the file of this patent:

UNITED STATES PATENTS

| Number | Name | Date |
|---|---|---|
| 2,257,830 | Wolff | Oct. 7, 1941 |
| 2,280,530 | Mountjoy | Apr. 21, 1942 |
| 2,455,693 | Mercer | Dec. 7, 1948 |